United States Patent
Cheng et al.

(10) Patent No.: US 9,036,874 B2
(45) Date of Patent: May 19, 2015

(54) IMAGE PROCESSING AND RECORDING SYSTEM PREIDENTIFYING AND PRESTORING IMAGES WITH PREDETERMINED FEATURES AND METHOD THEREOF

(71) Applicant: ALTEK CORPORATION, Hsinchu (TW)

(72) Inventors: Kuei-Hung Cheng, Zhubei (TW); Yen-Ping Teng, Tainan (TW); Che-Wei Hu, Kaohsiung (TW)

(73) Assignee: ALTEK CORPORATION, Hsinchu (TW)

( * ) Notice: Subject to any disclaimer, the term of this patent is extended or adjusted under 35 U.S.C. 154(b) by 239 days.

(21) Appl. No.: 13/755,177

(22) Filed: Jan. 31, 2013

(65) Prior Publication Data

US 2014/0072244 A1    Mar. 13, 2014

(30) Foreign Application Priority Data

Sep. 7, 2012  (TW) ............................ 101132894 A (51) Int. Cl.
G06K 9/00 (2006.01)
G06K 9/46 (2006.01)
G06F 17/30 (2006.01)

(52) U.S. Cl.
CPC ............................... *G06F 17/30247* (2013.01)

(58) Field of Classification Search
None
See application file for complete search history.

(56) References Cited

U.S. PATENT DOCUMENTS

| 5,296,927 | A | * | 3/1994 | Guillotel ................. 375/240.16 |
| 5,768,441 | A | * | 6/1998 | Yoshizawa et al. .......... 382/270 |
| 5,982,441 | A | * | 11/1999 | Hurd et al. ................ 348/417.1 |
| 6,020,926 | A | * | 2/2000 | Astle ....................... 375/240.24 |
| 6,577,679 | B1 | * | 6/2003 | Apostolopoulos ....... 375/240.12 |
| 8,774,519 | B2 | * | 7/2014 | Rousson ...................... 382/190 |
| 2002/0027563 | A1 | * | 3/2002 | Van Doan et al. ........... 345/630 |
| 2007/0276853 | A1 | * | 11/2007 | Hamza ......................... 707/101 |
| 2008/0166014 | A1 | * | 7/2008 | Marcus et al. ............... 382/103 |

(Continued)

OTHER PUBLICATIONS

FPGA Based Real Time Face Detection using Adaboost and Histogram Equalization, K. Padmaja, et al., IEEE—International Conference on Advances in Engineering, Science and Management (ICAESM—2012) Mar. 30, 31, 2012, pp. 111-115.*

(Continued)

*Primary Examiner* — Wenpeng Chen
(74) *Attorney, Agent, or Firm* — Bacon & Thomas, PLLC (57) ABSTRACT

An image processing and recording system and an image processing and recording method thereof are provided. An image processing and recording system includes a recording module, an access module, and an identification module. The recording module stores an image which includes N image blocks, and the N image blocks compose M image tiles. The identification module performs an image recognition procedure to identify a predetermined feature of the N image blocks picked up by the access module and generates N identification results. Each result includes an address of the tile in the image corresponding to the $K^{th}$ image block, a corresponding address of the $K^{th}$ image block in the image tile and whether the $K^{th}$ image block has the predetermined feature. Thus, the access module can pick up the image blocks having the predetermine feature to perform a next image recognition procedure.

18 Claims, 9 Drawing Sheets

(56) References Cited

U.S. PATENT DOCUMENTS

| | | | |
|---|---|---|---|
| 2008/0226192 A1* | 9/2008 | Silverstein et al. | 382/276 |
| 2009/0226044 A1* | 9/2009 | Ngan et al. | 382/115 |
| 2011/0206296 A1* | 8/2011 | Sakaguchi et al. | 382/299 |
| 2011/0299783 A1* | 12/2011 | Chotard et al. | 382/195 |
| 2011/0316854 A1* | 12/2011 | Vandrovec | 345/420 |
| 2012/0281921 A1* | 11/2012 | Dowell | 382/195 |

OTHER PUBLICATIONS

"Robust Real-Time Face Detection Based on Cost-Sensitive Adaboost Method," Yong Ma et al, Proceedings of 2003 International Conference on Multimedia and Expo, Jul. 6-9, 2003, vol. 2, pp. II-465-II-468.*

"A Novel SoC Architecture on FPGA for Ultra Fast Face Detection," Chun He et al, IEEE International Conference on Computer Design, 2009, Oct. 4-7, 2009, pp. 412-418.*

* cited by examiner

IMAGE PROCESSING AND RECORDING SYSTEM PREIDENTIFYING AND PRESTORING IMAGES WITH PREDETERMINED FEATURES AND METHOD THEREOF

CROSS-REFERENCE TO RELATED APPLICATION

This application claims the benefit of Taiwan Patent Application No. 101132894, filed on Sep. 7, 2012, in the Taiwan Intellectual Property Office, the disclosure of which is incorporated herein in its entirety by reference.

BACKGROUND OF THE INVENTION

1. Field of the Invention

The present invention generally relates to an image processing and recording system and method thereof, in particular to use specific coding information to record the identification result obtained from the image processing and recording system and method thereof.

2. Description of the Related Art

In present face identification processes conducted in a computer or a processor with computing functions, an image is generally divided into a plurality of image blocks first, and then each of the image blocks is used for the identification of a face feature. For example, each image block contains 22*22 pixels, and the image blocks are superimposed with one another, and the distance between adjacent image blocks is equal to the displacement of one pixel. In other words, two superimposed image blocks may have 21*22 pixels superimposed with each other.

In addition, the computer or processor with the computing functions uses each image block for the face identification, and then each image block will produce an identification result. In the flow of image identification, it usually requires reading the image blocks with the face feature repeatedly. For example, only 60% of the image blocks without the face feature are removed in a first-stage identification process, and in the second-stage identification process the remaining 40% of the image blocks which may with the face features must be read one by one. The repeated reading of the image blocks that may have the face feature after the first-stage identification process takes place occupies much of the internal memories of the computer.

SUMMARY OF THE INVENTION

Therefore, it is a primary objective of the present invention to provide an image processing and recording system and the method thereof to solve the problem of internal memory being occupied by the repeatedly-read image blocks in the successive identification process.

To achieve the foregoing objective, the present invention provides an image processing and recording system, and the image processing and recording system includes a recording module, an access module and an identification module. The recording module is arranged for storing an image wherein the image includes N image blocks, and the N image blocks compose M image tiles, and N and M are positive integers greater than 1, and N is greater than M. The access module couples to the recording module and is arranged for accessing the N image blocks or the M image tiles. The identification module which couples to the access module and the recording module, and which is arranged for performing a first image identification procedure of the N image blocks accessed by the access module identifies a predetermined feature and an image position of the N image blocks and produces N identification results corresponding to the N image blocks respectively. each identification result includes position information in the image of the image tile to which the $K^{th}$ image block corresponds, relative position information of the $K^{th}$ image block in the corresponding image tile, and parameter information of whether or not the $K^{th}$ image block has the predetermined feature, wherein K is a positive integer smaller than or equal to N. wherein, the recording module records the identification results having the predetermined feature, so that the access module selectively accesses the M image tiles to the identification module for performing a second image identification procedure based on the identification result having the predetermined feature.

Preferably, each parameter information may include a feature value, and the feature value represents a computing result of the predetermined feature obtained by the identification module.

Preferably, the access module may selectively access the M image tiles and provides the M image tiles to the identification module to perform the second image identification procedure based on whether or not the feature value of each identification result is greater than a threshold value.

Preferably, the recording module may further include a system memory unit and an internal memory unit, and the internal memory unit is coupled to the access module, the identification module and the system memory unit, and the system memory unit is provided for the access module to selectively access the N image blocks or the M image tiles to the internal memory unit.

Preferably, the predetermined feature may be a face feature.

Besides, the present invention further provides an image processing and recording method, and the image processing and recording method includes the steps of: using a recording module to store an image, wherein the image comprises N image blocks, and the N image blocks compose M image tiles, and N and M are positive integers greater than 1, and N is greater than M; using an access module to access the N image blocks or the M image tiles; using an identification module to perform a first image identification procedure of the N image blocks accessed by the access module, identify a predetermined feature and an image position of the N image blocks, and produce N identification results corresponding to the N image blocks respectively, wherein each identification result includes: position information in the image of the image tile to which the $K^{th}$ image block corresponds; relative position information of the $K^{th}$ image block in the corresponding image tile; and parameter information of whether or not the $K^{th}$ image block has the predetermined feature and K is a positive integer smaller than or equal to N; using the recording module to record the identification result having the predetermined feature; and using the access module to selectively access the M image tiles to the identification module for performing a second image identification procedure based on the identification results having the predetermined feature.

To achieve the foregoing objective, the present invention further provides an image processing and recording system, and the image processing and recording system includes a recording module, an access module, and an identification module. The recording module is arranged for storing an image, wherein the image includes N image blocks, and the N image blocks compose M image tiles, and N and M are positive integers greater than 1, and N is greater than M. The access module is coupled to the recording module and is arranged for accessing the N image blocks or the M image tiles. The identification module which is coupled to the access module and the recording module, and which is arranged for performing a first image identification procedure of the each image block in the M image tiles accessed by the access module identifies a predetermined feature and an image position of each image block in the M image tiles, and produces M identification results corresponding to the M image tiles respectively. Each identification result includes position information of the $K^{th}$ image tile in the image, relative position information of each image block in the $K^{th}$ image tile, information whether or not each image block in the $K^{th}$ image tile has the predetermined feature and parameter information comprising quantity information of the image blocks having the predetermined feature in the $K^{th}$ image tile, wherein K is a positive integer smaller than or equal to N. wherein, the recording module records each identification result having the predetermined feature, so that the access module selectively accesses the M image tiles to the identification module for performing a second image identification procedure based on the identification results having the predetermined feature.

To achieve the foregoing objective, the present invention further provides an image processing and recording method, and the image processing and recording method includes the steps of: using a recording module to store an image, wherein the image comprises N image blocks, and the N image blocks compose M image tiles, and N and M are positive integers greater than 1, and N is greater than M; using an access module to access the N image blocks or the M image tiles; using an identification module to perform a first image identification procedure of each image block in the M image tiles accessed by the access module, to identify a predetermined feature and an image position of each image block in the M image tiles, and to produce M identification results corresponding to the M image tiles, and each identification result includes position information of the $K^{th}$ image tile in the image; relative position information of each image block in the $K^{th}$ image tile; information whether or not each image block in the $K^{th}$ image tile has the predetermined feature; and parameter information comprising quantity information of the image blocks having the predetermined feature in the $K^{th}$ image tile, wherein K is a positive integer smaller than or equal to N; using the recording module to record each identification result having the predetermined feature; and using the access module to selectively access the M image tiles and to provide the M image tiles to the identification module to perform a second image identification procedure based on each identification result having the predetermined feature.

In summary, the processing and recording system and the method thereof has the following advantages:

(1) The identification results obtained from the first image identification procedure of the image processing and recording system and the image processing and recording method is different from the prior art, which memorize each image blocks and which does not matter whether the image blocks have the predetermined feature or not. In contrast, the image processing and recording system and the image processing and recording method can save the storing space of the memory because the recording module merely record the identification results having the predetermined feature.

(2) The image processing and recording system and the image processing and recording method of the present invention can utilize the identification results obtained from the last identification procedure to selectively access the image tiles having the predetermined feature, wherein the predetermined feature is determined by the last identification procedure, and it is commonly that plurality of image blocks have the predetermined feature in one image tile. Thus, the present invention can efficiently decrease the memory bandwidth.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of an image processing and recording system and an image processing and recording method thereof of the present invention will become apparent by the detailed description of the following embodiments and the illustration of related drawings as follows.

The image processing and recording system of the present invention can apply to any portable electronic device or image capture device such as a tablet PC, a Smartphone, a personal digital assistant, an Ultra-Mobile PC, a digital phone, a digital camera, a digital video camera, but is not limited thereto.

Figure 1:
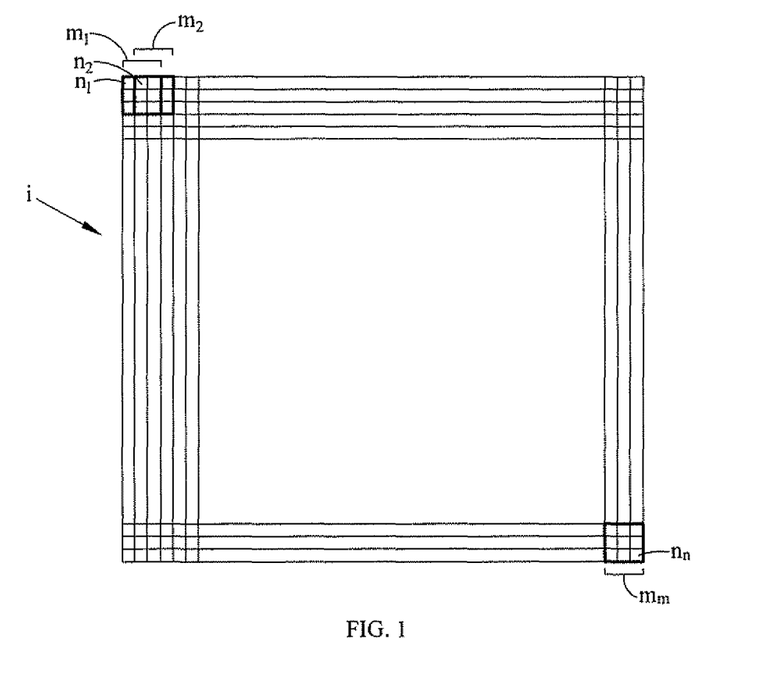
FIG. 1 is an illustration of the image of the present invention.

With reference to FIG. 1 for an illustration of an image of the present invention, the image i includes N image blocks $n_1$, $n_2$, ... and $n_n$, and the N image blocks compose M image tiles $m_1$, $m_2$, ... and $m_m$, wherein N and M are positive integers greater than 1, and N is greater than M.

More specifically, part of the N image blocks $n_1$, $n_2$ ... and $n_n$, can compose one image tile $m_1$, $m_2$ ... $m_m$. In other words, every image tile includes plurality of the image blocks. For more complete understanding, in the specification, each image block illustrates as including 9 image blocks, bus is not limited thereto.

Figure 2:
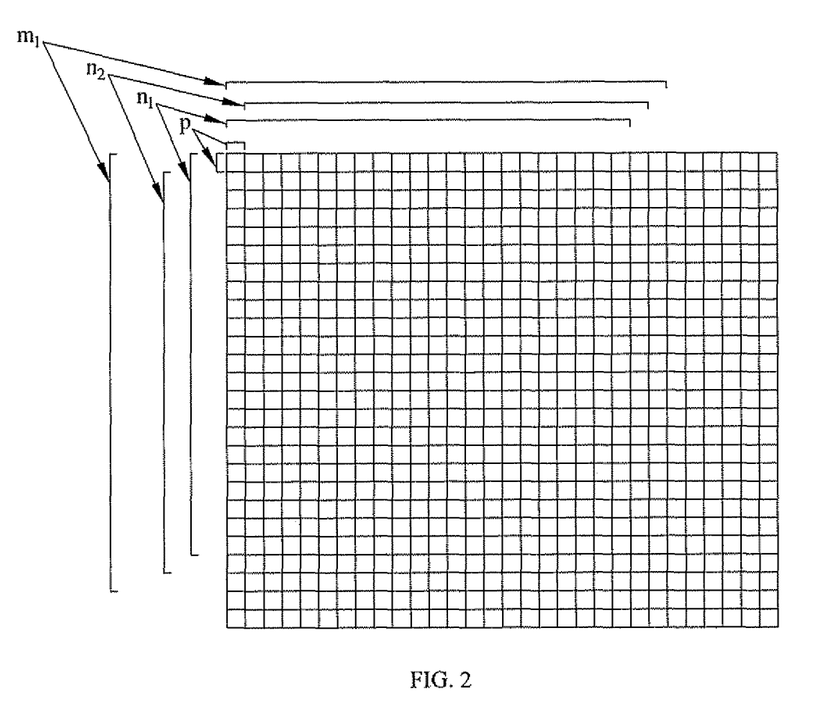
FIG. 2 is a partial exploding view of FIG. 1.

In addition, with reference to FIG. 2, which is an exploded view of partial FIG. 1 and which enlarges the image tile $m_1$, the size of each image block in the present embodiment is 22*22 pixels p but is not limited thereto, and the size of each image tile is 24*24 pixels p but is not limited thereto, wherein two adjacent image blocks $n_1$ and $n_2$ have 21*21 pixels p superimposed with each other, but is not limited thereto. In other embodiments of the present invention, the pixels sizes of the image blocks and the image tiles can define by the user through a process unit or a control unit.

Figure 3:
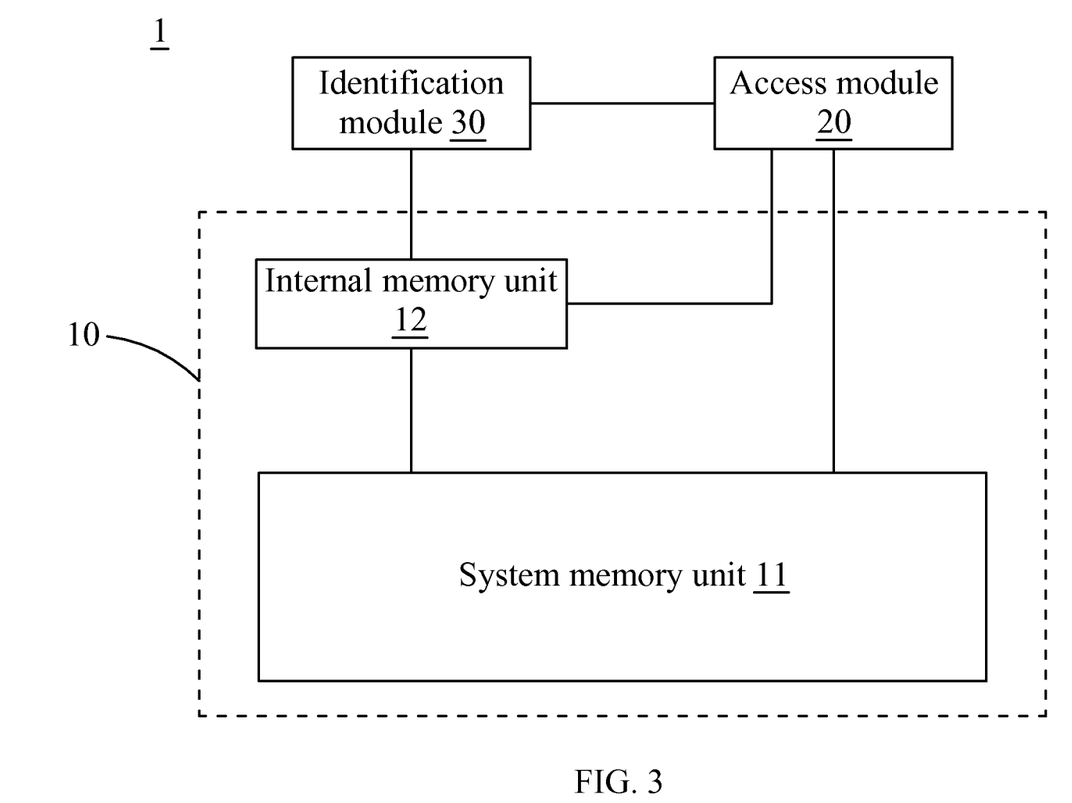
FIG. 3 is the block diagram of the first embodiment of the image processing and recording system of the present invention.

With reference to FIG. 3 for a block diagram of the first embodiment of the present invention, an image processing and recording system includes a recording module 10, an access module 20, and an identification module 30. In the present embodiment, the recording module 10 can further include a system memory unit 11 and an internal memory unit 12.

Wherein, the access module 20 is coupled to the internal memory unit 12 and the system memory unit 11 of the recording module 10. The identification module 30 coupled to the access module 20 and the internal memory unit 12, and the internal memory unit 12 is coupled to the system memory unit 11.

The recording module 10 is arranged for storing the image, which can be delivered from the remote storage (not illustrated) to the recording module 10, or which can be transmitted into the recording module 10 by the image pick-up unit when deriving images, but is not limited thereto. In other embodiments of the present invention, the image can be downloaded from the cloud internet and be recorded in the recording module 10.

The identification module 30 is arranged for identifying a predetermined feature. In the present embodiment, the predetermined feature is facial features, but is not limited thereto. In other embodiments of the present invention, the predetermined features can be a palm print feature, a pupil feature, an iris feature or any image features.

Figure 4:
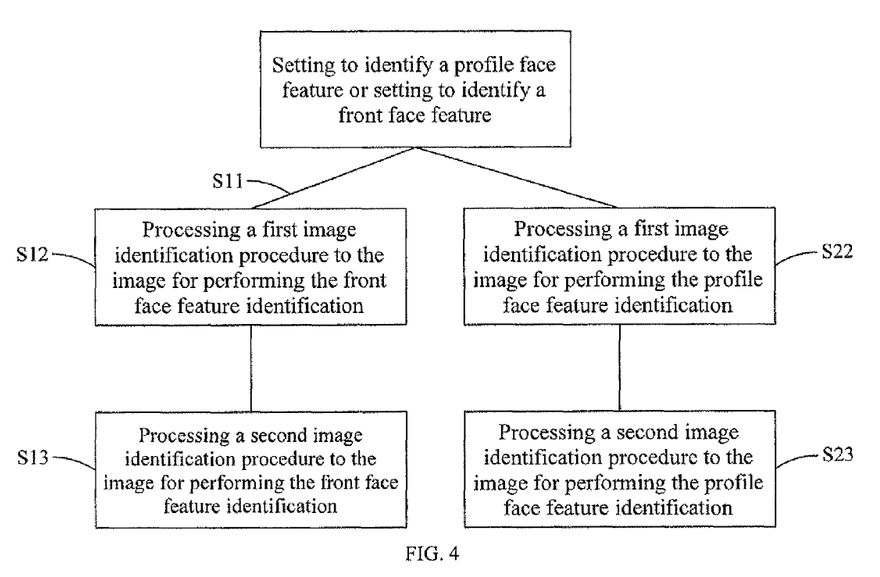
FIG. 4 is the flow chart of the image identification procedure of the first embodiment of the present invention.

With reference to FIG. 4 for a flow chart of an image identification procedure of the identification module accordance with the first embodiment of the present invention, the identification module of the present invention during the identification process of the facial features of the image includes plurality of image identification procedures and the identification module can perform the facial features identification respectively to each of the image blocks. More specifically, each identification procedure corresponds to a respective different algorithm, and all the different algorithm need to be applied to the operation process to decide whether each image block has the facial features or not. In the following flow chart description will use two image identification procedures for an exemplary embodiment, but is not limited thereto.

As illustrated in FIG. 4, in step S11, the identification module can be set to identify a profile face feature or set to identify a front face feature.

If the front face feature is desired to detect, step 12 then be proceeded to perform a first image identification procedure to the image for detecting the front face feature. Wherein, the partial of image blocks that are determined not have the front face feature can be eliminated after the image is detected by the first image identification procedure.

Next, in step 13, a second image identification procedure is proceeded to the image for performing the front face feature identification. The access module of the present embodiment can access the image blocks having the front face feature after the image is identified by the first image identification procedure, whereby performing the second image identification procedure to the image blocks having the front image feature. And the second image identification procedure can identify whether the image blocks identified by the first image identification procedure having the front face feature or not, and further eliminate the image blocks not having the front face feature.

If the profile face feature is desired to detect, step 22 then be proceeded to perform a first image identification procedure to the image for detecting the profile face feature, and then step 23 is proceeded to perform a second image identification procedure to the image for detecting the profile face feature. Wherein, because the profile face identification procedures are similar to the front face identification procedures, the profile face feature identification procedures are needless to mention herein.

With reference to FIG. 3 and FIG. 4, the image processing and recording system 1 can store the image which is desired to identify in the system memory unit 11 of the recording module 10. The system memory unit 11 of the present embodiment can be a dynamic random access memory, but is not limited thereto.

When the identification module 30 proceed the first image identification procedure for performing the front face identification to the image which stores in the system memory unit 11, the identification module 30 can drive the access module 20 to access the N image blocks one by one from the system memory unit 11 to the internal memory unit 12, so as to identify the front face feature of each image block and the image location of each image block by the identification module 30. And then store the identification results having the predetermined feature in the access module 10.

Next, with reference from FIG. 1 to FIG. 5, FIG. 5 illustrates the identification results of the first embodiment of the present invention. Each identification result includes position information in the image of the image tile to which the $K^{th}$ image block corresponds, relative position information of the $K^{th}$ image block in the corresponding image tile and parameter information of whether or not the $K^{th}$ image block has the predetermined feature, wherein K is a positive integer smaller than or equal to N in the present embodiment.

Figure 5:
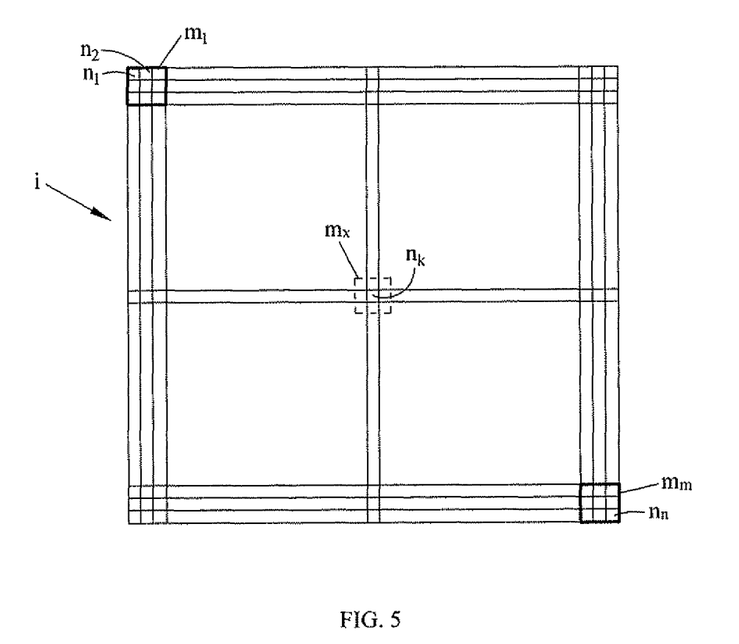
FIG. 5 is the illustration of the identification result of the first embodiment of the present invention.

The parameter information in the present embodiment can include a feature value, but is not limited thereto. The information of the feature value can exist in a numerical form, and the numerical form can represent the process result of the identification module 30 to the facial feature.

When the identification module 30 proceeds the second image identification procedure for performing the front face feature to the image blocks stored in the system memory unit 11, the identification module 30 can drive the access module 20 upon on each identification result stores in the recording module 10 to selectively access the image tiles $m_1, m_2, \ldots$ or $m_m$ from the system memory unit 11.

More specifically, the access module 20 can selectively access the image tiles $m_1, m_2, \ldots$ or $m_m$ based on each identification result whose feature value larger than a threshold value, so as to make the identification module 30 perform the second identification procedure to each image tile which is accessed from the access module 20.

Thus, because the access module 30 selectively access the image tiles $m_1, m_2, \ldots$ or $m_m$ whose front face feature value larger than the threshold value, so as to make the recording module 10 greatly decrease the bandwidth of the memory.

More specifically, in practical, the image blocks having the front face feature usually distribute continuously over the image. Therefore, the image tile has a plurality of image blocks simultaneously having the front face feature, so if the access module 20 only accesses the image tiles $m_1, m_2, \ldots$ and/or $m_m$ having the front face feature, the bandwidth of the memory of the recording module 10 can be greatly decrease.

For example, if after the first image identification procedure, there are 50 image tiles having the front face feature, then when in the second image identification procedure, the access module may merely need to access 10 image tiles owing to the continuously distribution of the front face feature of the image tiles in the image. Wherein, 50 front face features are distributes over 10 image tiles. Therefore, the access module only accesses the data quantity of 24*24*10 pixels, so as to largely decrease the bandwidth of the memory inside the recording module.

Besides, after the first image identification procedure, the recording module 10 can only store the identification results of the parameter information whose feature value is larger than the threshold value. Wherein, the identification results of the present embodiment is recorded in the system memory unit 11, but is not limited thereto.

Figure 6:
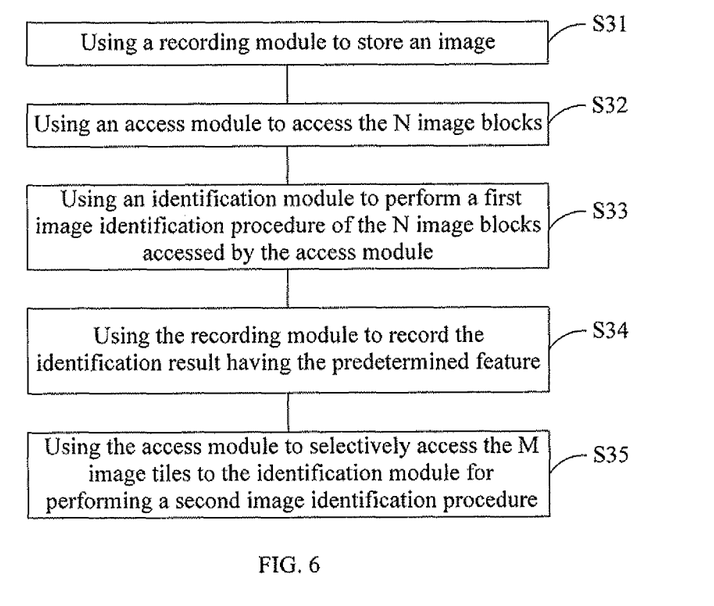
FIG. 6 is the flow chart of the first embodiment of the image processing and recording method of the present invention.

With reference to FIG. 6 for the flow chart of the first embodiment of the image processing and recording method of the present invention, the image processing and recording method of the present invention includes the following steps:

Step S31: Using a recording module to store an image. In the present embodiment, the system memory unit is arranged for storing the image, but is not limited thereto.

Step S32: Using an access module to access the N image blocks.

Step S33: Using an identification module to perform a first image identification procedure of the N image blocks accessed by the access module. The predetermined feature can be the face feature in the present embodiment, but is not limited thereto. The first identification procedure identifies a predetermined feature and an image position of the N image blocks. In the other embodiments of the present invention, the predetermined feature can be a palm feature, a pupil feature, an iris feature or any image features.

Identification module can produce N identification results to N image blocks respectively. Each identification result includes position information in the image of the image tile to which the $K^{th}$ image block corresponds, relative position information of the $K^{th}$ image block in the corresponding image tile, parameter information of whether or not the $K^{th}$ image block has the predetermined feature, wherein K is a positive integer smaller than or equal to N.

Step S34: Using the recording module to record the identification result having the predetermined feature.

Step S35: Using the access module to selectively access the M image tiles to the identification module for performing a second image identification procedure. Wherein, the parameter information of the identification result of each image block produced from the first identification procedure in step S33 can include feature value. The feature value can represent a computing result of the face feature obtained by the identification module, and the access module can selectively access the M image tiles based on feature value of each identification result greater than a threshold value.

In summary, by the image processing and recording module of the first embodiment, the identification module only need to drive access module to access the image tiles having the predetermined feature during the second image identification procedure, so the image processing and recording method of the present embodiment can efficiently decrease the memory bandwidth of the recording module.

Besides, because the recording module can only record each identification result having the predetermined feature, the image processing and recording method of the present embodiment can save the memory space of the recording module.

With reference to chart 1, it is an example of what recording module need to record when the identification module proceed further identification procedure (the second image identification procedure) base on the forward identification result (the first image identification procedure) of the first embodiment of the processing and recording system of the present invention.

CHART 1

The stored information type and the information bit count.

| Data bit-stream of each image block | Desired bit count | Contents |
|---|---|---|
| The first bit-stream | 16 | Absolute address of the image tile having face information (the most significant bit) |
| The second bit-stream | 16 | Absolute address of the image tile having face information (least significant bit) |
| The third bit-stream | 80 | Image parameter setting information |
| The forth bit-stream | 16 | The image block having face feature |
| The fifth bit-stream | 16 | The information of the image block having face feature |
| The sixth bit-stream | 16 | The process results |

Wherein, the information of the image block having face feature in the fifth bit-stream includes flag information of whether the image block is the last image block or not in its image tile. Excepting storing the process result in the sixth bit-stream, the sixth bit-stream can further include some special numerical value to denote a interruption program which decide whether the interrupt information need to transmit or to denote a the dummy information which includes storing format of specific bit-count.

It is noteworthy that when the access module need to access the image tiles having the face information, the access module can access the image tiles for next image identification procedure according to the information stored by the data bit-stream in chart 1. in the present embodiment, if the image block does not have the face information, the image processing and recording system of the present invention can use one bit to denote, and prior art need whole set information to record the image block which does not have face information. Moreover, the bit-count and the information needed to store of the image block having the face information are illustrated as chart 1. Therefore, through the first embodiment of the present invention, after the first image identification, the data quantity of the image need to be stored can decrease efficiently.

Figure 7:
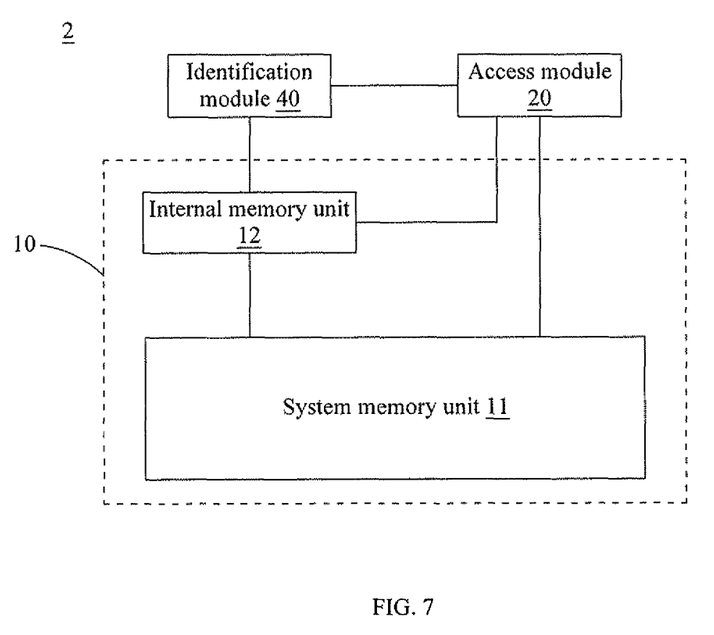
FIG. 7 is the block diagram of the second embodiment of the image processing and recording system of the present invention.

With reference to FIG. 7 for the block diagram of the second embodiment of the image processing and recording system of the present invention, the image processing and recording system 2 of the present invention includes recording module 10, access module 20 and identification module 40. In the present embodiment, the recording module 10 further includes a system memory unit 11 and an internal memory unit 12. Wherein, the difference between the second embodiment and the first embodiment is that when the identification module 40 of the present invention need to perform a first identification procedure of the front face feature to the image stored in the system memory unit 11, the identification module 40 can firstly drive the access module 20 to access M image tiles one by one from the system memory unit 11 to the internal image unit 12 for performing the first image identification procedure, but us not limited thereto.

In other words, the identification module 40 of the present embodiment can also drive the access module 20 to access N image blocks one by one from the system memory unit 11 to perform the first image identification procedure. It is worthy to be mentioned, the identification module 40 can depend on the type of the image desired to identify to choose using the image blocks identification modal or using the image tiles identification model to identify the predetermined feature to the image.

Figure 8:
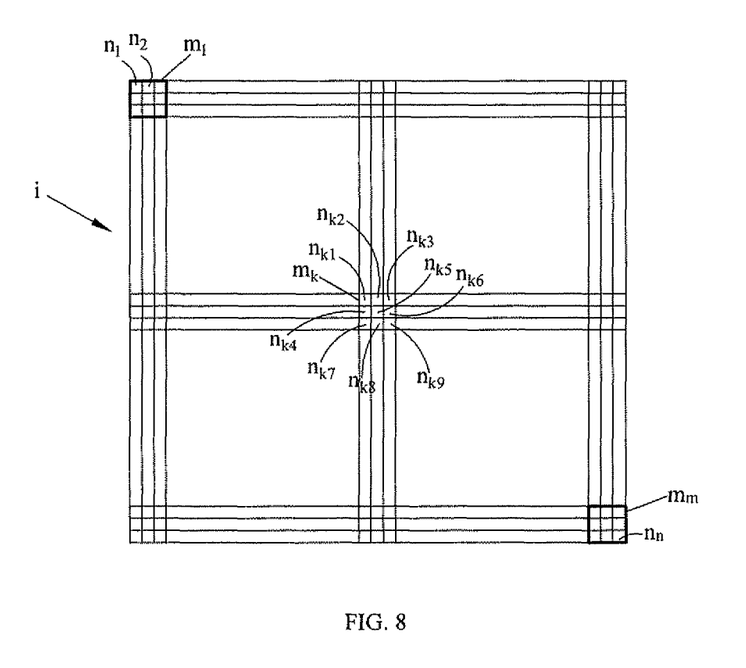
FIG. 8 is the illustration of the identification result of the second embodiment of the present invention.

With reference to FIG. 7 and FIG. 8, FIG. 8 is an illustration of the identification result of the second embodiment of the present invention. Wherein, after the identification module 40 proceeds the first image identification procedure to the image blocks $n_1, n_2, \ldots n_n$ of each image tiles $m_1, m_2 \ldots m_m$, the identification module can produces M image identification results corresponding to M image tiles $m_1, m_2 \ldots m_m$. Each identification result includes position information of the $K^{th}$ image tile $m_k$ in the image i, relative position information of each image block $n_{k1}, n_{k2}, n_{k3}, n_{k4}, n_{k5}, n_{k6}, n_{k7}, n_{k8}$, and $n_{k9}$ in the $K^{th}$ image tile $m_k$, information whether or not each image block $n_{k1}, n_{k2}, n_{k3}, n_{k4}, n_{k5}, n_{k6}, n_{k7}, n_{k8}$, and $n_{k9}$ in the $K^{th}$ K image tile $m_k$ has the predetermined feature and parameter information. Wherein, the parameter information includes quantity information of the image blocks having the determined feature in the $K^{th}$ image tile $m_k$, wherein K is a positive integer smaller than or equal to N.

Wherein, the present embodiment uses $n_{k3}$, $n_{k5}$ and $n_{k6}$ as an example of having the face feature. Then the parameter information has 3 results of the quantity information. These 3 results can be a feature value, but is not limited thereto. The information of the feature value can exist in form of a numerical value, and the numerical value can represent a computing result of the identification module 40 identifying the face feature.

When the identification module 40 performs the second image identification procedure of the front face feature to the image stored in the system memory unit 11, the identification module 40 can drive the access module 20 to selectively access image tiles $m_1, m_2 \ldots$ or $m_m$ from the system memory unit 11 based on each identification result stored in the recording module 10.

More specifically, the access module 20 can depend on each identification result whose feature value greater than a threshold value to selectively access the image tiles $m_1$, $m_2 \ldots$ or $m_m$, so as to make the identification module 40 can perform the second image identification procedure to the image tiles accessed by the access module 20.

As a result, comparing the second embodiment and the first embodiment, although both of which all uses the access module 20 to access the image tiles to proceed the face feature identification in the second identification procedure, the second embodiment can further save the memory space of the recording module 10 because the second embodiment can more simplify the identification result obtained from the identification module 40 owing to the continuous distribution of the face feature in image.

Besides, because the access module 20 can selectively choose the image tiles $m_1, m_2 \ldots$ and/or $m_m$ whose feature value of the front face feature are larger than the threshold value, the recording module 10 can greatly decrease the memory bandwidth.

Figure 9:
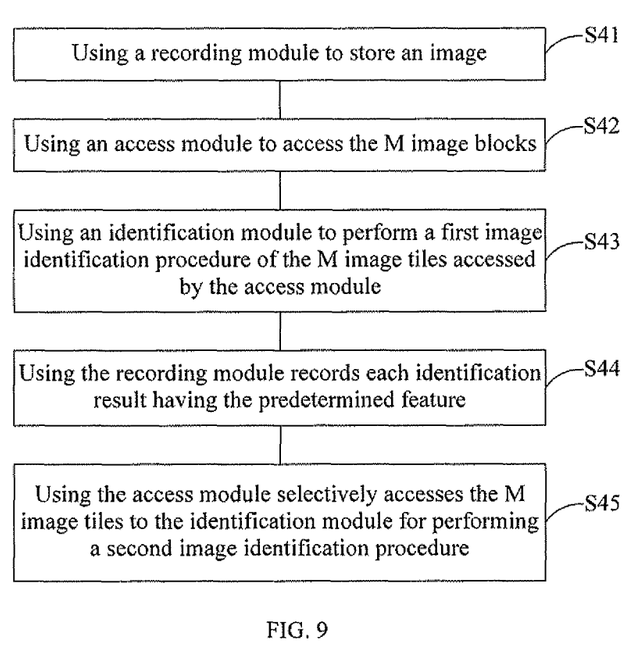
FIG. 9 is the flow chart of the second embodiment of the image processing and recording method of the present invention.

With reference to FIG. 9 for flow chart of the second embodiment of the image processing and recording method of the present invention, the image processing and recording method can include the following steps:

Step S41: Using a recording module to store an image. In the present embodiment, the system memory unit is arranged for storing the image, but is not limited thereto.

Step S42: Using an access module to access the M image blocks.

Step S43: Using an identification module to perform a first image identification procedure of the M image tiles accessed by the access module. The first identification procedure identifies a predetermined feature and an image position of the M image tiles. The predetermined feature can be the face feature in the present embodiment, but is not limited thereto. In the other embodiments of the present invention, the predetermined feature can be a palm feature, a pupil feature, an iris feature or any image features.

Identification module can produce M identification results to M image tiles respectively. Each identification result includes position information of the $K^{th}$ image tile in the image, relative position information of each image block in the $K^{th}$ image tile, information whether or not each image block in the $K^{th}$ image tile has the predetermined feature, and parameter information. Wherein, K is a positive integer smaller than or equal to N.

In step S44: Using the recording module records each identification result having the predetermined feature.

In step S45: Using the access module selectively accesses the M image tiles to the identification module for performing a second image identification procedure. More specifically, in step S43, the parameter information of each identification result obtained from the first identification procedure to each image tile can include a feature value. The feature value can represent a computing result of the face feature obtained by the identification module, and the access module can selectively access the M image tiles based on feature value of each identification result greater than a threshold value.

Thus, through the second embodiment of the image processing and recording method, because the identification module merely need to drive the access module to access the image tiles having the predetermined feature when performing the second image identification procedure, the image processing and recording method of the present embodiment can efficiently decrease the memory bandwidth inside the recording module.

Besides, because the recording module can merely record the identification results having the predetermined result, and use one bit to record the image tiles which do not have the predetermined feature, the memory space can accordingly being saved. Furthermore, by using only one bit information, the image processing and recording system and the image processing and recording method of the present embodiment can learn quickly that the image tile do not have the important message which is needed to be accessed in the next identification procedure to process, so as to decrease the judgment and processing time of the hardware.

From above, when performing the first identification procedure, the processing and recording system and the processing and recording method of the present invention can derive the access module to access each image block or each image tile to proceed the identification of the predetermined feature. By using the identification results obtained from the last image identification procedure, the subsequent image identification procedure can perform the predetermined feature identification upon on the identification results obtained from the last time. Thus, compare to the prior art which need to memorize the identification result whether image blocks has the predetermined feature and to memorize the position of each image block, the image processing and recording system of the present invention can efficiently decrease the memory bandwidth during the subsequent image identification procedure because it is commonly that plurality of image blocks having the predetermined feature are in one image tile. Besides, the recording module of the present invention can only use one bit to record the image blocks or the image tiles that do not have the predetermined feature. Thus, the processing and recording system and the processing and recording method of the present invention can save the memory space, so as to make the resource of the hard ware can be utilized efficiently.

Generally, embodiments of the present invention employ various processes involving data stored in or transferred through one or more computers or data processing devices. Embodiments of the present invention also relate to apparatus and systems for performing these operations. The apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer program code, computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An image processing and recording system, comprising:
   a recording module, arranged for storing an image which comprises N image blocks which compose M image tiles, wherein N and M are positive integers greater than 1, and N is greater than M;
   an access module, coupled to the recording module, arranged for accessing the N image blocks or the M image tiles; and
   an identification module, coupled to the access module and the recording module, arranged for performing a first image identification procedure of the N image blocks accessed by the access module, identifying a predetermined feature and an image position of the N image blocks, and producing N identification results corresponding to the N image blocks respectively, and each identification result comprising:
   position information in the image of the image tile to which a $K^{th}$ image block corresponds;
   relative position information of the $K^{th}$ image block in the corresponding image tile; and
   parameter information of whether or not the $K^{th}$ image block has the predetermined feature, wherein K is a positive integer smaller than or equal to N;
   wherein, the recording module records the identification result having the predetermined feature, so that the access module selectively accesses the M image tiles to the identification module to perform a second image identification procedure based on the identification result having the predetermined feature.

2. The image processing and recording system of claim 1, wherein each parameter information comprises a feature value which represents a computing result of the predetermined feature obtained by the identification module.

3. The image processing and recording system of claim 2, wherein the access module selectively accesses the M image tiles and provides the M image tiles to the identification module to perform the second image identification procedure based on whether or not the feature value of each identification result is greater than a threshold value.

4. The image processing and recording system of claim 1, wherein the recording module further comprises a system memory unit and an internal memory unit, and the internal memory unit is coupled to the access module, the identification module and the system memory unit, and the system memory unit is provided for the access module to selectively access the N image blocks or the M image tiles to the internal memory unit.

5. The image processing and recording system of claim 1, wherein the predetermined feature is a face feature.

6. An image processing and recording method, comprising the steps of:
   using a recording module to store an image which comprises N image blocks which compose M image tiles, wherein N and M are positive integers greater than 1, and N is greater than M;
   using an access module to access the N image blocks or the M image tiles;
   using an identification module to perform a first image identification procedure of the N image blocks accessed by the access module, identify a predetermined feature and an image position of the N image blocks, and produce N identification results corresponding to the N image blocks respectively, wherein each identification result comprises:
   position information in the image of the image tile to which a $K^{th}$ image block corresponds;
   relative position information of the $K^{th}$ image block in the corresponding image tile; and
   parameter information of whether or not the $K^{th}$ image block has the predetermined feature, and K is a positive integer smaller than or equal to N;
   using the recording module to record the identification result having the predetermined feature; and
   using the access module to selectively access the M image tiles to the identification module for performing a second image identification procedure based on the identification result having the predetermined feature.

7. The image processing and recording method of claim 6, wherein each parameter information comprises a feature value which represents a computing result of the predetermined feature obtained by the identification module.

8. The image processing and recording method of claim 7, wherein the access module selectively accesses the M image tiles and provides the M image tiles to the identification module to perform the second image identification procedure based on whether or not the feature value of each identification result is greater than a threshold value.

9. The image processing and recording method of claim 6, wherein the predetermined feature is a face feature.

10. An image processing and recording system, comprising:
- a recording module, arranged for storing an image which comprises N image blocks which compose M image tiles, wherein N and M are positive integers greater than 1, and N is greater than M;
- an access module, coupled to the recording module, arranged for accessing the N image blocks or the M image tiles; and
- an identification module, coupled to the access module and the recording module, arranged for performing a first image identification procedure of each image block in the M image tiles accessed by the access module, identifying a predetermined feature and an image position of each image block in the M image tiles, and producing M identification results corresponding to the M image tiles respectively, and each identification result comprising:
- position information of a $K^{th}$ image tile in the image;
- relative position information of each image block in the $K^{th}$ image tile;
- information whether or not each image block in the $K^{th}$ image tile has the predetermined feature; and
- parameter information comprising quantity information of the image blocks having the predetermined feature in the $K^{th}$ image tile, wherein K is a positive integer smaller than or equal to N;
- wherein, the recording module records each identification result having the predetermined feature, so that the access module selectively accesses the M image tiles to the identification module for performing a second image identification procedure based on the identification result having the predetermined feature.

11. The image processing and recording system of claim 10, wherein each parameter information comprises a feature value, and the feature value represents a computing result of the predetermined feature obtained by the identification module.

12. The image processing and recording system of claim 11, wherein the access module selectively accesses the M image tiles and provides the M image tiles to the identification module to perform the second image identification procedure based on whether or not the feature value of each identification result is greater than a threshold value.

13. The image processing and recording system of claim 10, wherein the recording module further comprises a system memory unit and an internal memory unit, and the internal memory unit is coupled to the access module, the identification module and the system memory unit, and the system memory unit is provided for the access module to selectively access the N image blocks or the M image tiles to the internal memory unit.

14. The image processing and recording system of claim 10, wherein the predetermined feature is a face feature.

15. An image processing and recording method, comprising the steps of:
- using a recording module to store an image which comprises N image blocks which compose M image tiles, and N and M are positive integers greater than 1, and N is greater than M;
- using an access module to access the N image blocks or the M image tiles;
- using an identification module to perform a first image identification procedure of each image block in the M image tiles accessed by the access module, to identify a predetermined feature and an image position of each image block in the M image tiles, and to produce M identification results corresponding to the M image tiles, and each identification result comprising:
- position information of a $K^{th}$ image tile in the image;
- relative position information of each image block in the $K^{th}$ image tile;
- information whether or not each image block in the $K^{th}$ image tile has the predetermined feature; and
- parameter information comprising quantity information of the image blocks having the predetermined feature in the $K^{th}$ image tile, wherein K is a positive integer smaller than or equal to N;
- using the recording module to record each identification result having the predetermined feature; and
- using the access module to selectively access the M image tiles to the identification module for performing a second image identification procedure based on each identification result having the predetermined feature.

16. The image processing and recording method of claim 15, wherein each parameter information comprises a feature value, and the feature value represents a computing result of the predetermined feature obtained by the identification module.

17. The image processing and recording method of claim 16, wherein the access module selectively accesses the M image tiles and provides the M image tiles to the identification module to perform the second image identification procedure based on whether or not the feature value of each identification is greater than a threshold value.

18. The image processing and recording method of claim 15, wherein the predetermined feature is a face feature.

* * * * *